United States Patent
Nakasha

(10) Patent No.: US 8,446,930 B2
(45) Date of Patent: May 21, 2013

(54) IMPULSE RADIO COMMUNICATION DEVICE

(75) Inventor: Yasuhiro Nakasha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 12/957,549

(22) Filed: Dec. 1, 2010

(65) Prior Publication Data

US 2011/0135028 A1    Jun. 9, 2011

(30) Foreign Application Priority Data

Dec. 3, 2009  (JP) .................. 2009-275506

(51) Int. Cl.
*H04B 1/00* (2006.01)

(52) U.S. Cl.
USPC ........... 375/130; 375/146; 375/147; 375/295; 375/286; 375/287; 375/260; 375/262; 375/265; 375/267

(58) Field of Classification Search
USPC .............. 375/285, 295, 296, 130, 146, 147, 375/150, 260, 262, 265, 267; 370/203, 208, 370/209, 320, 335, 342, 441, 479
See application file for complete search history.

(56) References Cited

U.S. PATENT DOCUMENTS

| | | | | |
|---|---|---|---|---|
| 7,072,101 | B2 * | 7/2006 | Kapteyn et al. | 359/337.5 |
| 7,764,135 | B2 * | 7/2010 | Mahooti | 331/74 |
| 2007/0019282 | A1 * | 1/2007 | Weiner et al. | 359/326 |
| 2007/0133712 | A1 * | 6/2007 | Benjebbour et al. | 375/295 |
| 2008/0198939 | A1 | 8/2008 | Nakasha et al. | |
| 2009/0206903 | A1 * | 8/2009 | Seddon et al. | 327/181 |

FOREIGN PATENT DOCUMENTS

JP    2008-205733 A    9/2008

OTHER PUBLICATIONS

Yamaguchi, Ryoichi et al.,"10-Gbit/s MMIC Wireless Link Exceeding 800 Meters", RWS 2008 Digest, Jan. 22, 2008, pp. 695-698.

* cited by examiner

*Primary Examiner* — Dhaval Patel
(74) *Attorney, Agent, or Firm* — Fujitsu Patent Center

(57) ABSTRACT

An impulse radio communication device includes a short pulse generator configured to change a shape of an impulse to be output; a bandpass filter configured to receive the impulse and output the impulse as a wave packet; an amplifier configured to amplify an output from the bandpass filter; and an antenna configured to output the wave packet, output from the amplifier, as a wireless signal, the short pulse generator includes a control section configured to change the shape of the impulse to be output, in response to an environmental condition of a transmission path for wireless communication.

8 Claims, 17 Drawing Sheets

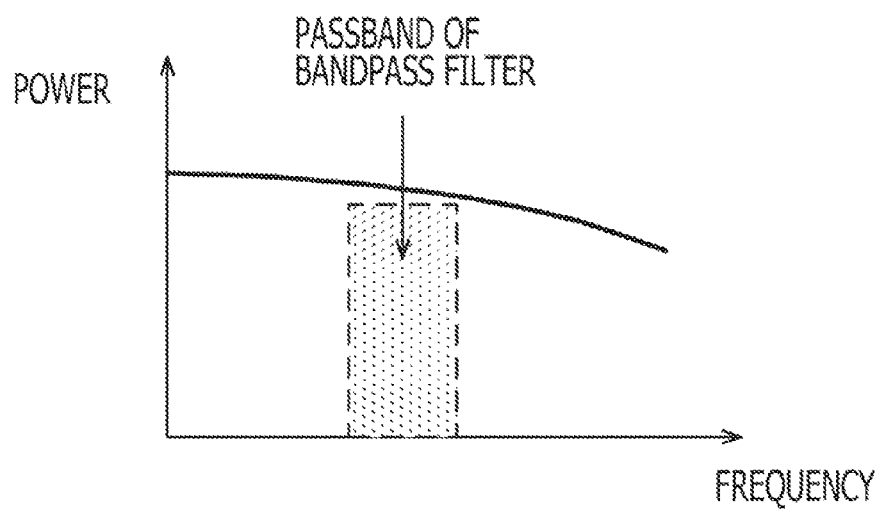

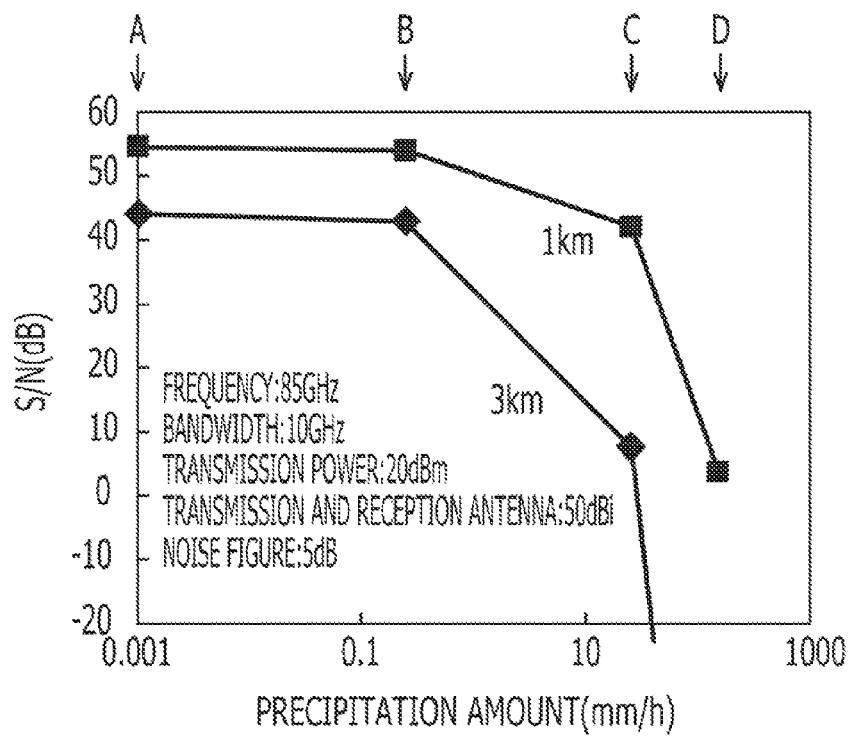

IMPULSE RADIO COMMUNICATION DEVICE

CROSS-REFERENCE TO RELATED APPLICATIONS

This application is based upon and claims the benefit of priority of the prior Japanese Patent Application No. 2009-275506, filed on Dec. 3, 2009, the entire contents of which are incorporated herein by reference.

FIELD

The disclosure generally relates to an impulse radio communication device.

BACKGROUND

Owing to the explosive increase of the number of Internet users and the increased capacities and the diversification of contents, it is hoped that the transmission capacity of wireless communication is increased. As high-capacity wireless transmission, the utilization of a millimeter waveband in which the number of commercial wireless stations is small and a wide frequency band is easily secured is suitable. Compared with a narrowband communication device that uses a carrier system, a wireless communication device, which uses an impulse system, has a characteristic that a local oscillator and a mixer are not necessary, and hence the configuration of a wireless section is simple and the cost of the wireless section is low. Therefore, the wireless communication device is hoped as a tool for realizing high-capacity wireless transmission that has a transmission rate of more than 10 gigabits per second (Gbps).

For example, FIG. 1 is a diagram illustrating an impulse radio communication system that uses a millimeter waveband and, for example, has a transmission rate of 10 Gbps.

As illustrated in FIG. 1, the impulse radio communication system that uses the millimeter waveband includes a transmission device 100 and a reception device 105. The transmission device 100 includes a short pulse (impulse) generator 101, a bandpass filter 102, a transmission amplifier (amp) 103, and an antenna 104. The reception device 105 includes an antenna 106, a reception amplifier (amp) 107, and a detector 108.

In the transmission device 100, on the basis of a data signal that is input from a baseband section and has a bit rate of, for example, 10 Gbps, the short pulse generator 101 generates a signal that has an infinitesimal half-value width (pulse width) and is called an impulse. The impulse output from the short pulse generator 101 includes energy that ranges from direct current to a high frequency. As illustrated in FIG. 2, the bandpass filter 102 extracts only a frequency component, used for communication, from a wide band frequency component included in the impulse. Accordingly, the output of the bandpass filter 102 is modulated as a wave packet that oscillates in the vicinity of the center frequency of a passband. The transmission amplifier 103 amplifies the wave packet output from the bandpass filter 102 so that the power of the wave packet reaches a certain level. The antenna 104 transmits the amplified wave packet as a millimeter-wave signal to the air. On the other hand, in the reception device 105, the reception amplifier 107 amplifies a weak millimeter-wave signal received by the antenna 106, and the detector 108 detects the envelope of the millimeter-wave signal to decode the millimeter-wave signal as a data signal.

An impulse communication device that uses a millimeter waveband includes a transmission device 100 and a reception device 105, and transmits and receives a signal to and from a communication device. In some cases, the impulse communication device includes the transmission device 100 and the reception device 105 separately. However, in other cases, the impulse communication device includes a common antenna used for transmission and reception and a switch which switches the connection state of the antenna so that the antenna is connected to one of the transmission amplifier 103 and the reception amplifier 107. Hereinafter, a transmission device included in a communication device used for transmission and reception is called a transmission section, and a reception device included in the communication device is called a reception section.

For example, in an impulse communication system in which a millimeter waveband used for an outdoor fixed-line communication is utilized, it is desirable to secure a wide dynamic range in the entire system, in order to cover a transmission path fluctuation due to a weather condition or the like.

FIG. 3 is a diagram illustrating changes in a signal-to-noise (S/N) ratio, due to an outdoor situation, in a case in which an impulse communication system that uses a millimeter waveband, which has a frequency of 85 gigahertz (GHz) and a bandwidth of 10 GHz, and has transmission power of 100 milliwatts (20 dBm), a transmission and reception antenna gain of 50 dBi, and a noise figure of 5 decibel (dB) is used for an outdoor fixed-line communication. In FIG. 3, a horizontal axis indicates a precipitation amount of millimeters per hour (mm/h), a vertical axis indicates a S/N ratio (dB), "A" indicates a clear weather state, "B" indicates a rainfall state that nearly corresponds to a drizzle, "C" indicates a rainfall state that corresponds to a heavy rain, "D" indicates a rainfall state that corresponds to a sheeted rain that occurs less commonly during a year, and "1 km" and "3 km" indicate communication distances in kilometers.

With reference to FIG. 3, it turns out that, when data is transmitted using a bit rate of 10 Gbps over a distance of 3 km using a millimeter wave the band of which is 80 GHz-90 GHz, a fluctuation of more than or equal to 100 dB in a space propagation loss occurs between a clear weather condition and a sheeted rain condition in which a precipitation amount is 100 mm per hour.

A communication system is requested to allow a communication path to be secured even in the sheeted rain. Accordingly, the communication device is requested to have a dynamic range of more than or equal to 100 dB. In a usual impulse communication device that uses a millimeter waveband, a dynamic range has been secured by causing the gain of a transmission amplifier or a reception amplifier to be variable.

FIG. 4A is a diagram illustrating the configuration of the transmission device in which the gain of the transmission amplifier is variable. FIG. 4B is a diagram illustrating the configuration of the reception device in which the gain of the reception amplifier is variable.

The configuration of the transmission device illustrated in FIG. 4A corresponds to a configuration in which, in the transmission device 100 in FIG. 1, the transmission amplifier 103 is replaced with a variable gain transmission amplifier 103'. The configuration of the reception device illustrated in FIG. 4B corresponds to a configuration in which, in the reception device 105 in FIG. 1, the reception amplifier is replaced with a variable gain reception amplifier 107'.

In a system in which the transmission device and the reception device, illustrated in FIGS. 4A and 4B respectively, are used, for example, while the gains of the variable gain reception amplifier 107' and/or the variable gain transmission amplifier 103' are individually set to maximum in a sheeted rain, the gains of the variable gain reception amplifier 107' and/or the variable gain transmission amplifier 103' are individually reduced in clear weather.

However, typically, a relationship between a dynamic range and performances such as a low noise property, a high output property, and a broadband property is a trade-off relationship. Therefore, if a variable gain range is enlarged, it is necessary to sacrifice these properties. In this way, in the communication device that uses a millimeter waveband, including the impulse radio communication device, it has been difficult to secure a sufficient dynamic range.

An example of the related art is Japanese Unexamined Patent Application Publication No. 2008-205733, and R. Yamaguchi, et al. "10-Gbit/s MMIC Wireless Link Exceeding 800 Meters" RWS2008 Digest, pp. 695-698.

SUMMARY

According to an aspect of the invention, an impulse radio communication device includes a short pulse generator configured to change a shape of an impulse to be output; a bandpass filter configured to receive the impulse and output the impulse as a wave packet; an amplifier configured to amplify an output from the bandpass filter; and an antenna configured to output the wave packet, output from the amplifier, as a wireless signal, the short pulse generator includes a control section configured to change the shape of the impulse to be output, in response to an environmental condition of a transmission path for wireless communication.

According to another aspect of the invention, an impulse radio communication device includes a short pulse generator; a bandpass filter configured to receive an impulse and output the impulse as a wave packet; an amplifier configured to amplify an output from the bandpass filter; and an antenna configured to output the wave packet, output from the amplifier, as a wireless signal, wherein the short pulse generator includes a first variable delay buffer configured to delay a transmission data by a first delay time, and cause the first delay time to change in response to a first delay control signal; a second variable delay buffer configured to delay the transmission data by a second delay time different from the first delay time, and cause the second delay time to change in response to a second delay control signal; and a logical AND circuit configured to generate the impulse by calculating a logical product of an output of the first variable delay buffer and an output of the second variable delay buffer, and cause a gain of the impulse to change in response to a gain control signal, wherein the short pulse generator configured to change a pulse width of the impulse in response to the first delay control signal and the second delay control signal with a constant amplitude of the impulse being maintained using the gain control signal.

According to another aspect of the invention, an impulse radio communication device includes a short pulse generator; a bandpass filter configured to receive an impulse and output the impulse as a wave packet; an amplifier configured to amplify an output from the bandpass filter; and an antenna configured to output the wave packet, output from the amplifier, as a wireless signal, wherein the short pulse generator includes a first variable delay buffer configured to output a first delayed output by delaying a transmission data by a first delay time, and cause the first delay time and a gain of the first delayed output to change in response to a first control signal; a second variable delay buffer configured to output a second delayed output by delaying the transmission data by a second delay time, and cause the second delay time and a gain of the second delayed output to change in response to a second control signal; and a logical AND circuit configured to generate the impulse by calculating a logical product of an output of the first variable delay buffer and an output of the second variable delay buffer, wherein the short pulse generator configured to change a pulse width of the impulse in response to the first control signal and the second control signal with a constant amplitude of the impulse being maintained using the first control signal and the second control signal.

The object and advantages of the invention will be realized and attained by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a wide band frequency component included in an impulse extracted by a bandpass filter;

FIG. 3 is a diagram illustrating changes in a S/N ratio, due to an outdoor situation, in a case in which a millimeter waveband that has a frequency of 85 GHz and a bandwidth of 10 GHz is used, and an impulse communication system that has transmission power of 20 dBm, a transmission and reception antenna gain of 50 dBi, and a noise figure of 5 dB is used for an outdoor fixed-line communication;

DESCRIPTION OF EMBODIMENTS

An impulse radio communication device according to a first embodiment is, for example, an impulse communication device that uses a millimeter wave, the band of which is 70 GHz-80 GHz, and transmits data the bit rate of which is 10 Gbps. In addition, the impulse radio communication device includes a transmission device and a reception device, and transmits and receives data to and from a communication device.

Figure 1:
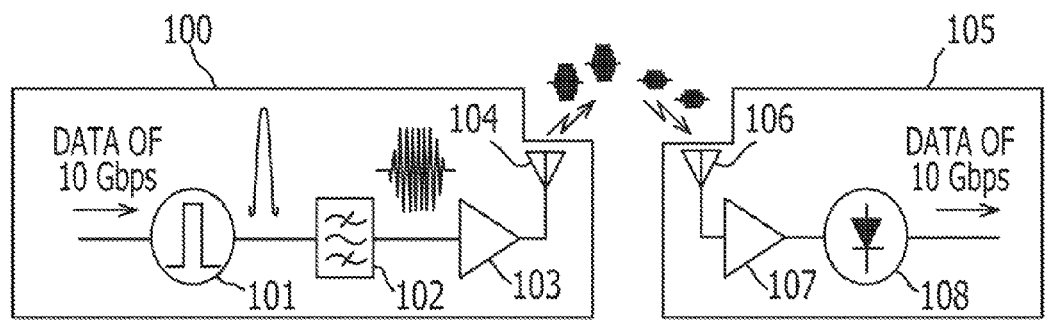
FIG. 1 is a diagram illustrating a configuration of an impulse radio communication system.
Figure 4A:
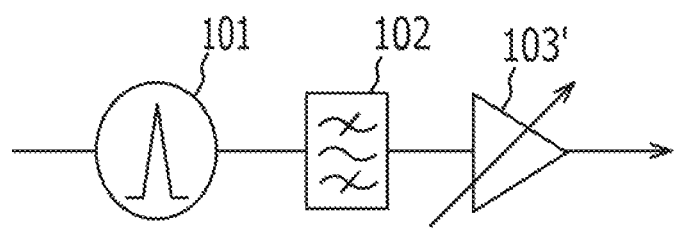
FIGS. 4A and 4B are diagrams illustrating configurations of a transmission device in which a gain of a transmission amplifier is variable and a reception device in which a gain of a reception amplifier is variable, respectively.
Figure 4B:
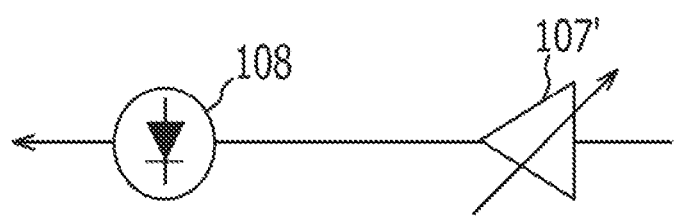
Figure 5:
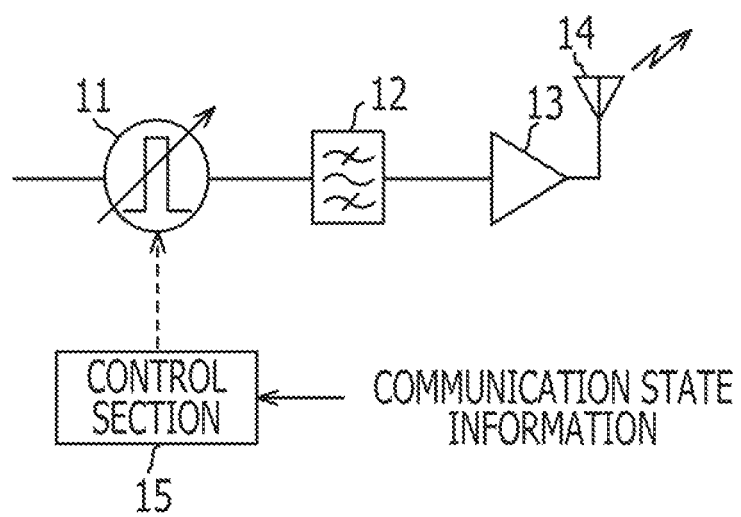
FIG. 5 is a diagram illustrating a configuration of a transmission section in an impulse radio communication device according to a first embodiment.

FIG. 5 is a diagram illustrating the configuration of a transmission device in the impulse radio communication device according to the first embodiment. In addition, the impulse radio communication device according to the first embodiment also includes a reception device, not illustrated.

As illustrated in FIG. 5, the transmission device in the impulse radio communication device according to the first embodiment includes a short pulse (impulse) generator 11, a bandpass filter 12, a transmission amplifier (amp) 13, an antenna 14, and a control section 15.

On the basis of a data signal that is input from a baseband section and, for example, has a bit rate of 10 Gbps, the short pulse generator 11 generates a signal that has an infinitesimal half-value width (pulse width) and is called an impulse. In response to a pulse shape control signal from the control section 15, the short pulse generator 11 changes the shape of the impulse to be output. The bandpass filter 12 extracts a frequency component used for communication from a wide band frequency component included in the impulse, and modulates the extracted frequency component into a wave packet that oscillates in the vicinity of the center frequency of a passband. The transmission amplifier 13 amplifies the wave packet output from the bandpass filter 12 so that the power of the wave packet reaches a certain level. In addition, it is preferable that the transmission amplifier 13 be configured to vary a gain. The antenna 14 transmits the amplified wave packet as a millimeter-wave signal to the air. On the basis of communication state information, the control section 15 generates the pulse shape control signal used for controlling the shape of the impulse generated in the short pulse generator 11.

Specifically, when the communication state information indicates that a transmission path loss is large, the pulse shape control signal, used for changing the shape of the impulse so that the spectral intensity of the wave packet in a millimeter waveband becomes high, is generated. In addition, when the communication state information indicates that a transmission path loss is small, the pulse shape control signal, used for changing the shape of the impulse so that the spectral intensity of the wave packet in the millimeter waveband becomes low, is generated.

According to the impulse radio communication device in the first embodiment, the short pulse generator 11 changes the shape of the impulse in response to the communication state information. Accordingly, the spectral intensity of the wave packet to be output in the millimeter waveband changes. Therefore, even if the gain of the transmission amplifier 13 is constant, the signal intensity of the wave packet to be transmitted can be changed. In this way, a variable gain amount for the transmission amplifier 12 and the reception amplifier can be reduced in accordance with the variable amount of a transmission signal intensity, which is obtained by changing the shape of the impulse. Accordingly, a wide dynamic range can be secured with various kinds of performances such as a low noise property, a high output property, and a broadband property or the like not being degraded.

Figure 6:
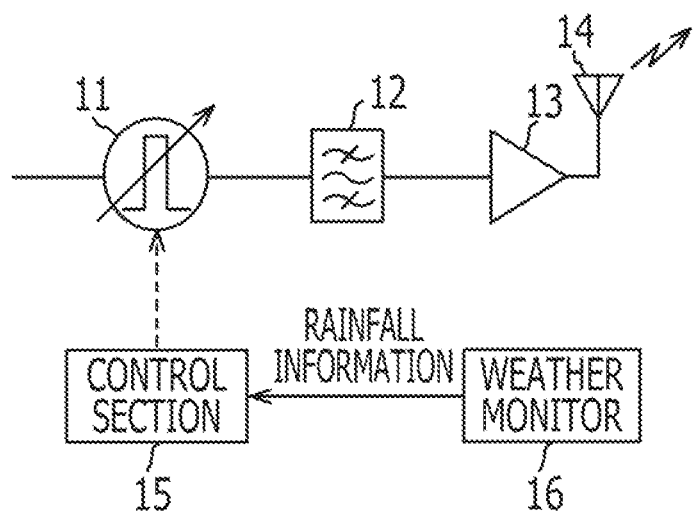
FIG. 6 is a diagram illustrating a configuration of a transmission section in an impulse radio communication device according to a second embodiment.

FIG. 6 is a diagram illustrating the configuration of a transmission section in an impulse radio communication device according to a second embodiment.

The impulse radio communication device according to the second embodiment is different from the impulse radio communication device according to the first embodiment in that the impulse radio communication device according to the second embodiment includes a weather monitor 16 that generates rainfall information as the communication state information and outputs the rainfall information to the control section 15. As illustrated in FIG. 3, in an impulse communication system in which a millimeter waveband used for an outdoor fixed-line communication is used, the space propagation loss of a transmission path fluctuates in response to a rainfall state. The weather monitor 16 detects the rainfall state of the outdoor in which the impulse radio communication device according to the second embodiment is placed, and generates the rainfall information. The control section 15 preliminarily stores a relationship between the rainfall state and the space propagation loss, illustrated in FIG. 3. In addition, the control section 15 evaluates a space propagation loss in the rainfall state on the basis of the rainfall information supplied from the weather monitor 16, and generates the pulse shape control signal so that the space propagation loss is compensated.

Figure 7:
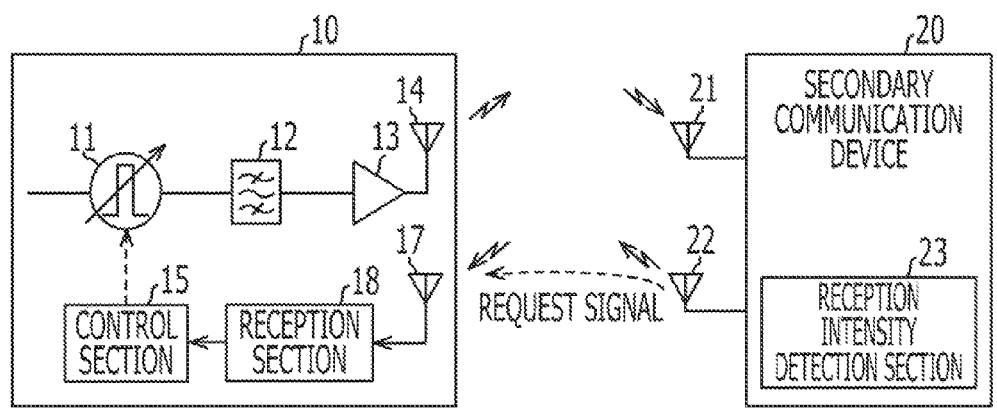
FIG. 7 is a diagram illustrating a configuration of an impulse radio communication system according to a third embodiment.

FIG. 7 is a diagram illustrating the configuration of an impulse radio communication system according to a third embodiment. In FIG. 7, a reference No. 10 indicates a main communication device, and a reference No. 20 indicates a secondary communication device that communicates with the main communication device 10. The main communication device 10 may be substantially the same as the communication device according to the first embodiment, illustrated in FIG. 5, but also includes a receive antenna 17 and a reception section 18 that includes a reception amplifier and a detector as illustrated in FIG. 7. The secondary communication device 20 includes a reception antenna 21, a transmission antenna 22, a reception intensity detection section 23, and a reception section and a transmission section that are not illustrated in FIG. 7. The reception intensity detection section 23 detects the intensity of a reception signal received by the reception section, and determines the space propagation loss on the basis of the detected reception intensity. Accordingly, the reception intensity detection section 23 determines whether or not it is necessary to change the spectral intensity of the wave packet in a millimeter waveband using the shape change of the impulse, performed in the main communication device 10. When it is determined that it is necessary to change the shape of the impulse in the main communication device 10, the reception intensity detection section 23 transmits a request signal, which includes information relating to the space propagation loss, from the transmission section to the main communication device 10 through the transmission antenna 22. The main communication device 10 receives the request signal at the reception section 18 through the receive antenna 17, and obtains the information relating to the space propagation loss, thereby generating the pulse shape control signal so that the space propagation loss is compensated.

As described above, in a usual impulse communication device, a dynamic range has been secured by causing the gain of a transmission amplifier or a reception amplifier to be variable. In addition, while a technique in which the pulse width of an impulse is changed in order to improve power consumption and a signal quality has been proposed before now, the shape of the impulse has not been changed in order to secure the dynamic range.

In order to generate the impulse, a short pulse generator that includes a delay circuit, which delays a data signal to generate a delayed data signal, and a logical AND circuit, which generates the logical product of the data signal and the delayed data signal, is used. Here, using, as the delay circuit, a variable delay circuit that causes the delay amount of the delayed data signal to be variable, the width of the generated impulse is changed. However, in such a short pulse generator, using the variable delay circuit, only an overlap time between two signals input to the logical AND circuit through two signal lines respectively is simply changed. Therefore, with respect to the impulse generated in such a short pulse generator, when the half-value width of the impulse is enlarged, the amplitude of the impulse also becomes large at the same time. Accordingly, the spectrum of the impulse in the millimeter waveband does not decrease. Namely, if such a short pulse generator is used, it may be difficult to control a transmission output by changing the spectral intensity of the impulse.

Consequently, in an impulse radio communication device according to a fourth embodiment, described next, a short pulse generator that generates an impulse the spectral intensity of which can be changed is used.

Figure 8:
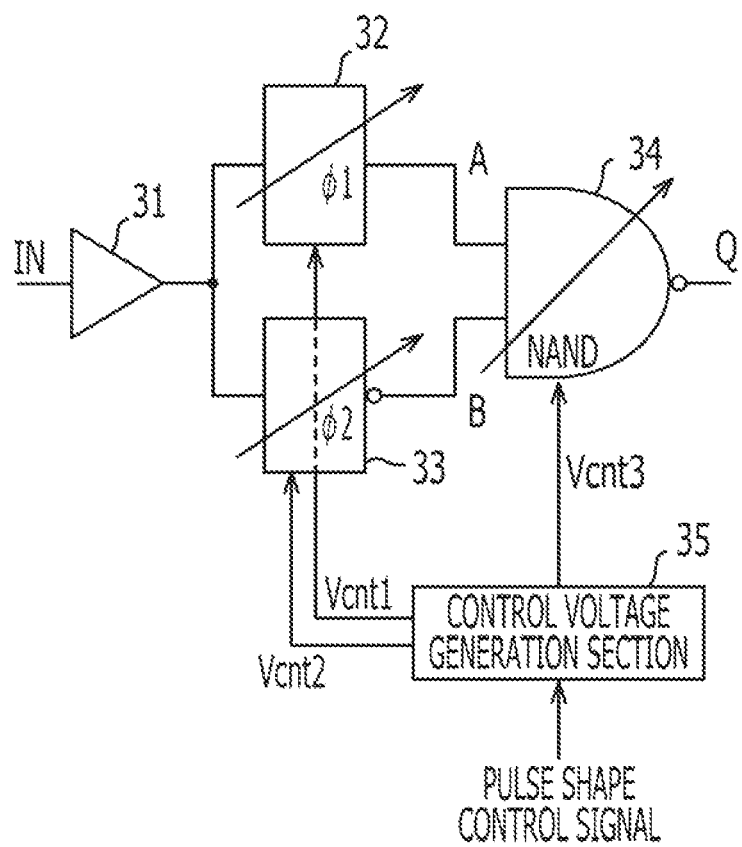
FIG. 8 is a diagram illustrating a configuration of a short pulse generation section in an impulse radio communication device according to a fourth embodiment.

FIG. 8 is a diagram illustrating the configuration of a short pulse generator 11 in the impulse radio communication device according to the fourth embodiment. Other than the short pulse generator 11, the impulse radio communication device according to the fourth embodiment may have substantially the same configuration as the communication device according to the first embodiment, illustrated in FIG. 5.

As illustrated in FIG. 8, the short pulse generator 11 in the impulse radio communication device according to the fourth embodiment includes a amplifier 31, a first variable delay buffer 32, a second variable delay buffer 33, a logical AND circuit 34, and a control voltage generation section 35. The amplifier 31 amplifies an input signal (input data) IN. The first variable delay buffer 32 delays the output of the amplifier 31 by a first delay time, and outputs the delayed output as a first delayed output. In addition, the first variable delay buffer 32 can change the first delay time in response to a first voltage signal Vcnt1. The second variable delay buffer 33 delays the output of the amplifier 31 by a second delay time, and outputs the delayed output as a second delayed output. In addition, the second variable delay buffer 33 can change the second delay time in response to a second voltage signal Vcnt2. Here, while the second variable delay buffer 33 inverts and outputs the output of the amplifier 31, the first variable delay buffer 32 outputs the output of the amplifier 31 without inverting the output of the amplifier 31. Furthermore, the first delay time is different from the second delay time at any time, and the first delay time is longer than the second delay time. The logical AND circuit 34 calculates the logical product of the first delayed output from the first variable delay buffer 32 and the second delayed output from the second variable delay buffer 33, and generates an output Q. Here, the logical AND circuit 34 is a NAND circuit, and hence the output Q turns out to be an impulse. The logical AND circuit 34 changes a gain in response to a third voltage signal Vcnt3, and thereby the amplitude of the impulse changes.

On the basis of a control signal from the control section 15 (illustrated in FIG. 7), the control voltage generation section 35 generates the first voltage signal Vcnt1, the second voltage signal Vcnt2, and the third voltage signal Vcnt3. The control voltage generation section 35 includes a memory used for storing a table, in which necessary transmission power, the amplitude and the half-value width of a pulse that corresponds to an output Q necessary for the transmission power, and the values of the Vcnt1, the Vcnt2, and the Vcnt3, which are used for realizing the amplitude and the half-value width of the pulse, are written, and a digital-to-analog (D/A) converter used for generating the Vcnt1, the Vcnt2, and the Vcnt3 on the basis of these values. In addition, the control section 15 may generate the first voltage signal Vcnt1, the second voltage signal Vcnt2, and the third voltage signal Vcnt3. Accordingly, the control voltage generation section 35 may be omitted.

Figure 9A:
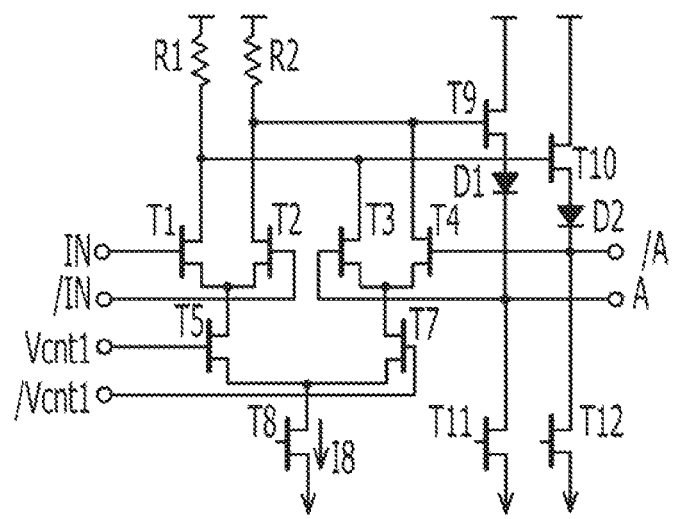
FIGS. 9A and 9B are diagrams illustrating circuit configurations of a first variable delay buffer and a logical AND circuit (NAND circuit), respectively.
Figure 9B:
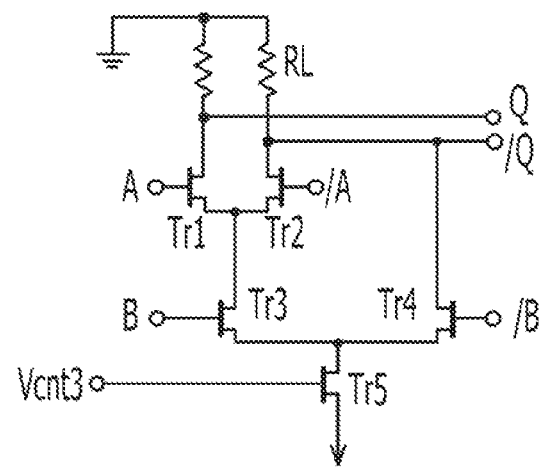

FIG. 9A illustrates the circuit configuration of the first variable delay buffer 32, and FIG. 9B illustrates the circuit configuration of the logical AND circuit (NAND circuit) 34.

As illustrated in FIG. 9A, the input signals of the first variable delay buffer 32 are complementary signals IN and /IN. In addition, the first voltage signal also corresponds to complementary signals Vcnt1 and /Vcnt1. The first delayed output also corresponds to complementary signals A and /A. The IN and the /IN are input to the gates of a transistor pair of T1 and T2, respectively, and the Vcnt1 and the /Vcnt1 are input to the gates of a transistor pair of T5 and T7, respectively.

When the IN is low (L), an electric current that flows in the T1 is large and an electric current that flows in the T2 is small. Therefore, the gate voltage of the T9 is high, an electric current that flows in the T9 is small, a diode D1 turns off, and the A turns out to be L. In the same way, the gate voltage of the T10 is low, an electric current that flows in the T10 is large, a diode D2 turns on, and the /A turns out to be high (H). An electric current that flows in the T3 is large because the A is L, and an electric current that flows in the T4 is small because the /A is H.

Here, a case in which the IN changes from L to H will be considered. In this case, the /IN changes from H to L. In response to this, the electric current that flows in the T1 decreases, and the electric current that flows in the T2 increases. In addition, since the gate voltage of the T9 decreases and the electric current that flows in the T9 increases, the D1 changes to an on-state, and the A changes to H. In parallel with this, since the gate voltage of the T10 increases and the electric current that flows in the T10 decreases, the D2 changes to an off-state, and the /A changes to L. Furthermore, the decrease of the electric current that flows in the T3 causes the gate voltage of the T10 to further increase, and the increase of the electric current that flows in the T4 causes the gate voltage of the T9 to further decrease. Accordingly, the outputs A and /A are fixed as H and L, respectively.

Furthermore, a case in which the IN changes from H to L will be considered. In this case, the /IN changes from L to H. In response to this, the electric current that flows in the T1 increases, and the electric current that flows in the T2 decreases. In addition, since the gate voltage of the T9 increases and the electric current that flows in the T9 decreases, the D1 changes to an off-state, and the A changes to L. In parallel with this, since the gate voltage of the T10 decreases and the electric current that flows in the T10 increases, the D2 changes to an on-state, and the /A changes to H. Furthermore, the increase of the electric current that flows in the T3 causes the gate voltage of the T10 to further decrease, and the decrease of the electric current that flows in the T4 causes the gate voltage of the T9 to further increase. Accordingly, the outputs A and /A are fixed as L and H, respectively.

The electric currents that flow in the T1 and the T2 are controlled by the electric current that flows in the T5, and the electric current that flows in the T5 is controlled by the Vcnt1. Accordingly, when the Vcnt1 is small, the electric currents that flow in the T1 and the T2 are large. In addition, when the Vcnt1 is large, the electric currents that flow in the T1 and the T2 are small. In the same way, the electric currents that flow in the T3 and the T4 are controlled by the electric current that flows in the T7, and the electric current that flows in the T7 is controlled by the /Vcnt1. Accordingly, when the /Vcnt1 is small, the electric currents that flow in the T3 and the T4 are large. In addition, when the /Vcnt1 is large, the electric currents that flow in the T3 and the T4 are small. Here, since the Vcnt1 and the /Vcnt1 are signals complementary to each other, a relationship between the Vcnt1 and the /Vcnt1 is that when the Vcnt1 is large, the /Vcnt1 is small, and when the Vcnt1 is small, the /Vcnt1 is large. Furthermore, the sum of the electric currents that flow in the T5 and the T7 flows in T8. In addition, since the electric current that flows in the T8 is constant, a relationship between the electric currents that flow in the T5 and the T7 is a complementary relationship that when one of the electric currents that flow in the T5 and the T7 increases, the other decreases, and when the one decreases, the other increases.

As described above, when the IN changes from L to H, the electric current that flows in the T1 decreases. However, in a case in which the Vcnt1 is small, since the electric current that flows in the T1 is large, the change of the electric current that flows in the T1 is sharp. In addition, in a case in which the Vcnt1 is large, since the electric current that flows in the T1 is small, the change of the electric current that flows in the T1 is mild. The change of the electric current that flows in the T2 is the same as that of the electric current that flows in the T1. When the electric currents that flow in the T1 and the T2 change, the gate voltages of the T9 and the T10 change. The changes of the gate voltages are affected by the changes of the electric currents that flow in the T1 and the T2. In addition, when the Vcnt1 is small, the changes of the gate voltages are sharp, and when the Vcnt1 is large, the changes of the gate voltages are mild. Furthermore, in response to the changes of the gate voltages of the T9 and the T10, the electric currents that flow in the T9 and the T10 change. In addition, when the Vcnt1 is small, the changes of the electric currents are sharp, and when the Vcnt1 is large, the changes of the electric currents are mild. Furthermore, in response to the changes of the electric currents that flow in the T9 and the T10, the D1 and D2 are turned on or turned off. In addition, when the changes of the electric currents that flow in the T9 and the T10 are sharp, the state changes of the D1 and D2 are fast, and when the changes of the electric currents that flow in the T9 and the T10 are mild, the state changes of the D1 and D2 are slow. Accordingly, when the Vcnt1 is small, the changes of the outputs A and /A are fast, and when the Vcnt1 is large, the changes of the outputs A and /A are slow. In other words, when the Vcnt1 is small, the delay times of the outputs A and /A are small, and when the Vcnt1 is large, the delay times of the outputs A and /A are large. The changes of outputs A and /A cause the T3 and the T4 to sharply change the gate voltages of the T9 and the T10, thereby the output states of the outputs A and /A being fixed. Accordingly, the pulse itself sharply changes. A case in which the IN changes from H to L is the same as the case in which the IN changes from L to H, and hence the description thereof is omitted.

As described above, in the first variable delay buffer 32 in FIG. 9A, the delay time (Delay) of the output pulse (first delayed output) can be changed by changing the first voltage signal Vcnt1.

While the circuit configuration of the second variable delay buffer 33 is the same as that of the first variable delay buffer 32, the output thereof is inverted and used.

As illustrated in FIG. 9B, the first delayed outputs A and /A, second delayed outputs B and /B, the third voltage signal Vcnt3 are input to the logical AND circuit (NAND circuit) 34. The third voltage signal Vcnt3 is a single-ended signal. The logical AND circuit (NAND circuit) 34 in FIG. 9B is a logical AND circuit widely known. In the NAND circuit 34, a drain current that flows in the transistor Tr5 to which the Vcnt3 applied is controlled, and the gm of Tr1 to Tr4 are changed, thereby causing a gain gm of RL to be variable. Specifically, when the Vcnt3 is small, an amplitude becomes large, and when the Vcnt3 is large, the amplitude becomes small.

Figure 10:
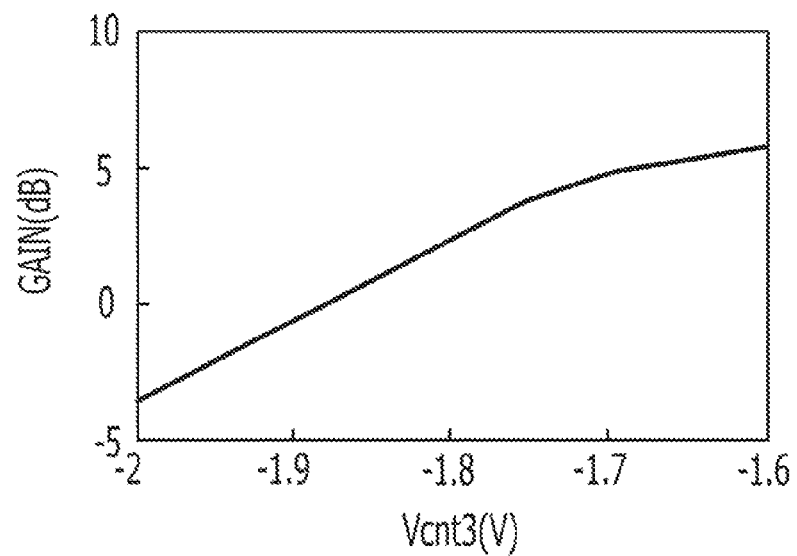
FIG. 10 is a diagram illustrating an example of a change in a gain with respect to a change of a third control voltage in a logical AND circuit (NAND circuit)

FIG. 10 is a diagram illustrating an example of a variation in a gain with respect to the variation of the third control voltage Vcnt3 in the logical AND circuit (NAND circuit) 34 in FIG. 9B.

Figure 11:
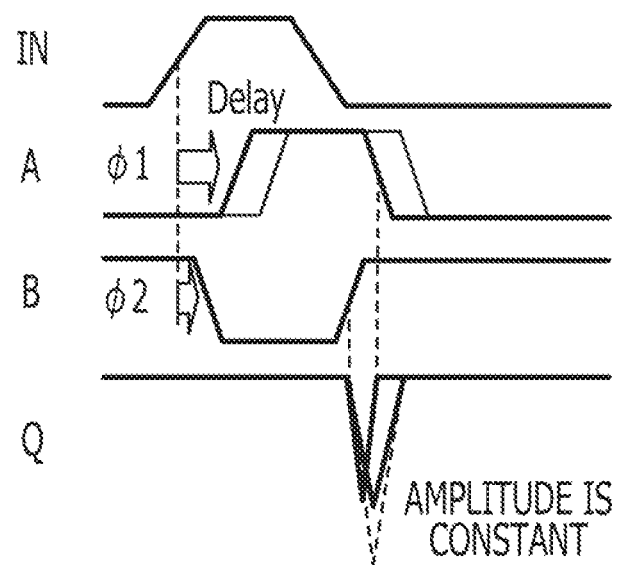
FIG. 11 is a time chart illustrating an operation performed in a short pulse generation section.

FIG. 11 is a time chart illustrating an operation performed in the short pulse generator 11 in FIG. 8. As illustrated in FIG. 11, when an input signal IN is input to the first variable delay buffer 32, the first variable delay buffer 32 delays the input signal IN by a delay time (Delay) Φ1 specified by the Vcnt1, and outputs a first delayed output A. When the input signal IN is input to the second variable delay buffer 33, the second variable delay buffer 33 inverts the input signal IN, delays the input signal IN by a delay time (Delay) (D2 specified by the Vcnt2, and outputs a second delayed output B. Since the Φ2 is less than the Φ1, the high (H) portions of the A and B overlap each other in the vicinity of the negative-going edge of the A, and hence the NAND circuit 34 generates a negative impulse Q.

Here, when the Vcnt1 and Vcnt2 are changed, the pulse width of the impulse Q is changed. For example, in a case in which the Vcnt2 is equal to −0.15 V, when the Vcnt1 is changed from −0.1 V to +0.06 V, the pulse half-value width changes from 3.5 ps to 6 ps. However, when the Vcnt3 is constant and the gain of the NAND circuit 34 is constant, the pulse amplitude of a pulse increases with an increase of the half-value width of the pulse.

Figure 12:
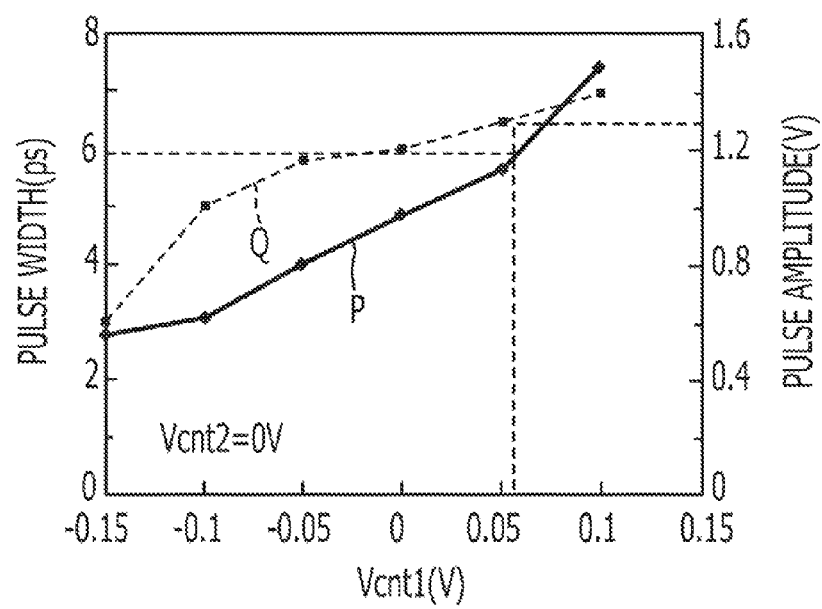
FIG. 12 is a diagram illustrating changes of a pulse width and a pulse amplitude of an impulse when a control voltage is changed in the short pulse generation section.

FIG. 12 is a diagram illustrating changes of the pulse width and the pulse amplitude of the impulse Q when the Vcnt2 is equal to −0.15 V, the Vcnt3 is equal to −1.6 V, and the Vcnt1 is changed from −0.15 V to +0.1 V. In FIG. 12, "P" indicates the change of the pulse width, and "Q" indicates the change of the pulse amplitude. For example, when the Vcnt1 is equal to 0.05 V, the pulse width is 6 ps, and the pulse amplitude is 1.3 V.

Therefore, in the fourth embodiment, by changing the Vcnt3, the Vcnt3 is controlled so that the gain of the NAND circuit 34 becomes small, thereby keeping the pulse amplitude constant. Specifically, in a normal state, when the Vcnt1 is equal to −0.1 V, the Vcnt2 is equal to −0.15 V, and the Vcnt3 is equal to −1.6 V, the impulse Q, the pulse half-value width of which is 3.5 picoseconds (ps) and the pulse amplitude of which is 0.6 V, is output. In a state in which electric power is reduced, when the Vcnt1 is equal to +0.06 V, the Vcnt2 is equal to −0.15 V, and the Vcnt3 is equal to −1.88 V, the impulse Q, the pulse half-value width of which is 6 ps and the pulse amplitude of which is 0.6 V, is output. In this case, compared with the normal state, the gain of the NAND circuit 34 decreases by 6 dB. Accordingly, even if the pulse half-value width increases, the amplitude is kept constant.

Figure 13:
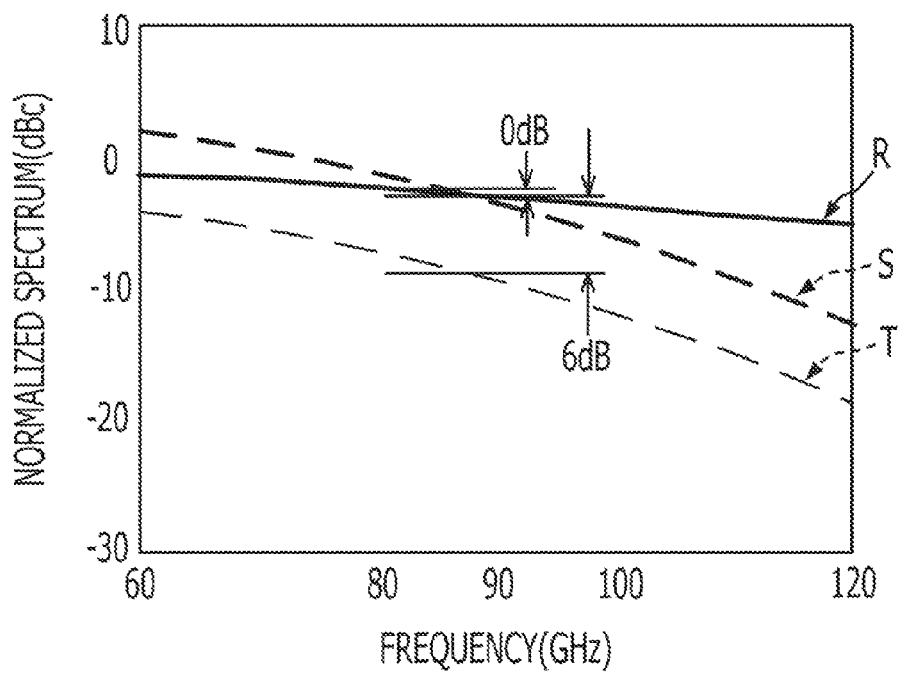
FIG. 13 is a diagram for explaining an advantageous effect of the fourth embodiment and illustrating a variation in a normalized spectrum of the impulse specified by a pulse width tw and a pulse amplitude Vp, with respect to an operating frequency.

FIG. 13 is a diagram for explaining an advantageous effect of the fourth embodiment, and illustrates a variation in the normalized spectrum of the impulse specified by a pulse width tw and a pulse amplitude Vp, with respect to an operating frequency. The operating frequency band of an impulse radio communication is 80 GHz to 100 GHz. In FIG. 13, "R" indicates a case in which the pulse width tw is 3.5 ps and the pulse amplitude Vp is 0.6 V, "S" indicates a case in which the pulse width tw is 6 ps and the pulse amplitude Vp is 1.2 V, and "T" indicates a case in which the pulse width tw is 6 ps and the pulse amplitude Vp is 0.6 V.

A case in which only the pulse width is controlled and the pulse amplitude is not controlled will be considered by comparing the R with the S. In this case, there is almost no difference between the spectrum intensities of the R and the S in the operating frequency band, hence it turns out that there is no advantageous effect of power control. On the other hand, a case in which the pulse amplitude is kept constant and the pulse width is changed, as in the first embodiment, will be considered by comparing the R with the T. In this case, considering a difference between the spectrum intensities of the R and the T in the operating frequency band, it turns out that power control that ranges from 0 dB to 6 dB can be performed. Accordingly, a dynamic range between transmission and reception devices is magnified without the broadband property and the low noise property of a transmission and reception amplifier being damaged, hence transmission quality is improved.

Figure 14:
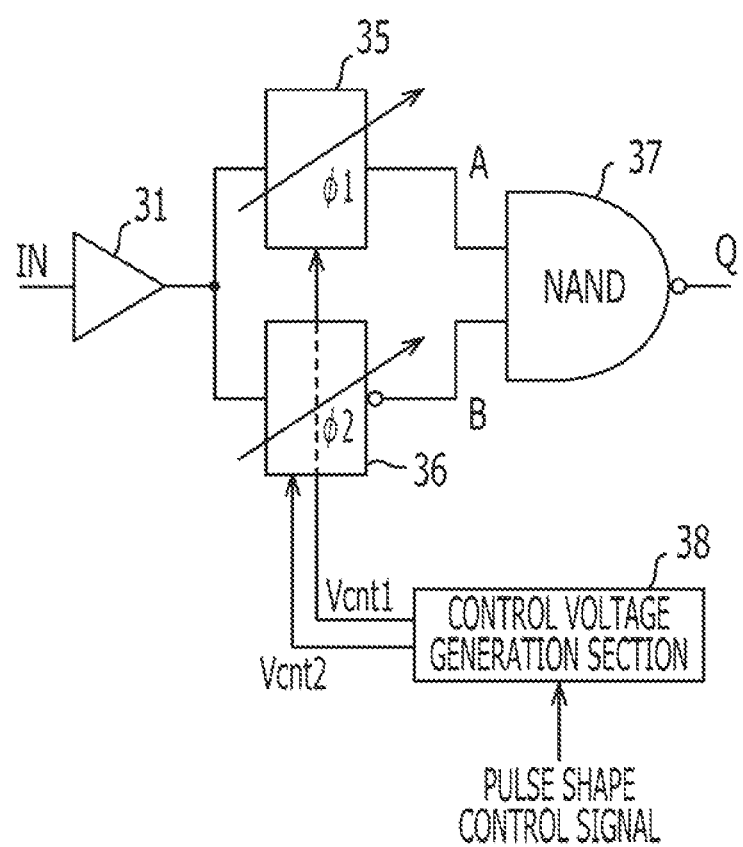
FIG. 14 is a diagram illustrating a configuration of a short pulse generation section in an impulse radio communication device according to a fifth embodiment.

FIG. 14 is a diagram illustrating the configuration of a short pulse generator 11 in an impulse radio communication device according to a fifth embodiment. Other than the short pulse generator 11, the impulse radio communication device according to the fifth embodiment may have substantially the same configuration as the communication device according to the first embodiment, illustrated in FIG. 5.

As illustrated in FIG. 14, while the short pulse generator 11 in the impulse radio communication device according to the fifth embodiment may have substantially a similar configuration as the short pulse generator 11 in the fourth embodiment, illustrated in FIG. 8, the short pulse generator 11 in the fifth embodiment is different from the short pulse generator 11 in the fourth embodiment in that the gains of a first variable delay buffer 35 and a second variable delay buffer 36 are also variable, and the gain of a NAND circuit 37 is not variable.

On the basis of a control signal from the control section 15, a control voltage generation section 38 generates a first voltage signal Vcnt1 and a second voltage signal Vcnt2. The control voltage generation section 38 includes a memory used for storing a table, in which necessary transmission power, the amplitude and the half-value width of a pulse that corresponds to an output Q necessary for the transmission power, and the values of the Vcnt1 and the Vcnt2, which are used for realizing the amplitude and the half-value width of the pulse, are written, and a D/A converter used for generating the Vcnt1 and the Vcnt2 on the basis of these values.

Figure 15:
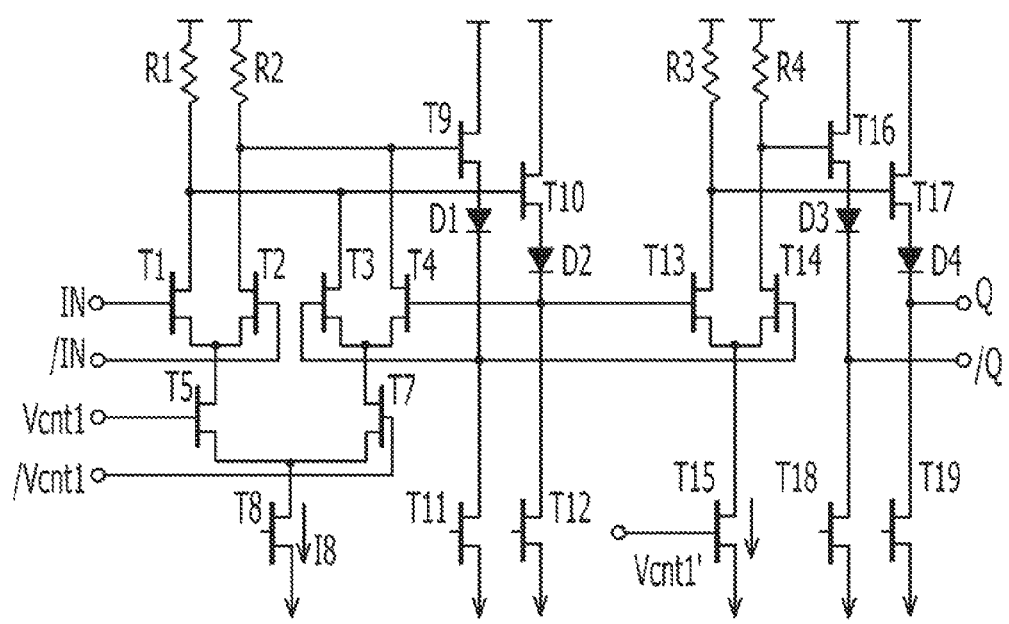
FIG. 15 is a diagram illustrating a circuit configuration of the first variable delay buffer.

FIG. 15 illustrates the circuit configuration of the first variable delay buffer 35 according to the fifth embodiment. As illustrated in FIG. 15, the first control voltage signal includes complementary signals Vcnt1 and /Vcnt1 and a single-ended signal Vcnt1'. While the second variable delay buffer 36 has the circuit configuration illustrated in FIG. 15, a control voltage is different.

A left-hand segment in FIG. 15 includes a similar configuration as the circuit configuration illustrated in FIG. 9A, and a pulse the delay time of which is changed in response to the Vcnt1 and the /Vcnt1 is output to the right side. A right-hand segment in FIG. 15 includes a configuration in which an output section is added to the circuit configuration illustrated in FIG. 9B, and the amplitude of a pulse output from the left-hand segment is changed in response to the Vcnt1'.

Figure 16A:
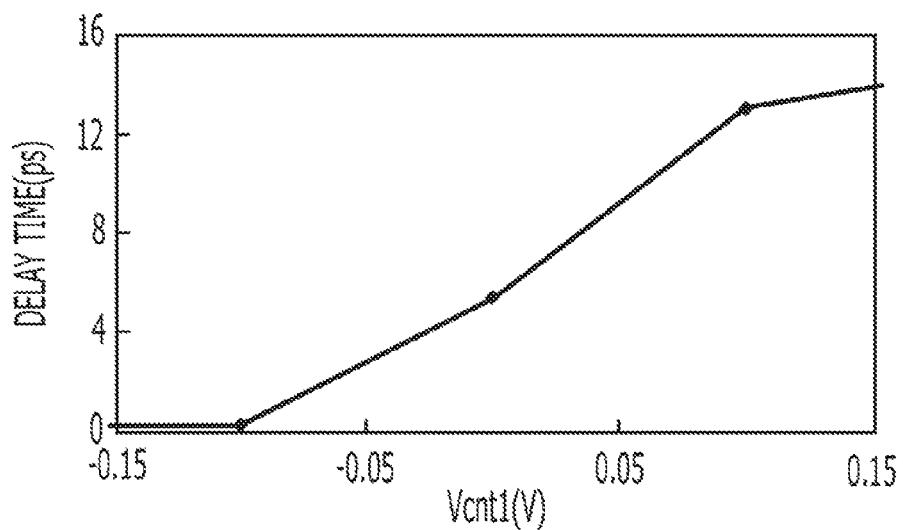
FIGS. 16A and 16B are diagrams illustrating characteristics of the first variable delay buffer.

FIG. 16A is a diagram illustrating the delay control characteristic of the first variable delay buffer 35 illustrated in FIG. 15. A delay time changes in response to the Vcnt1 as illustrated in 16A.

Figure 16B:
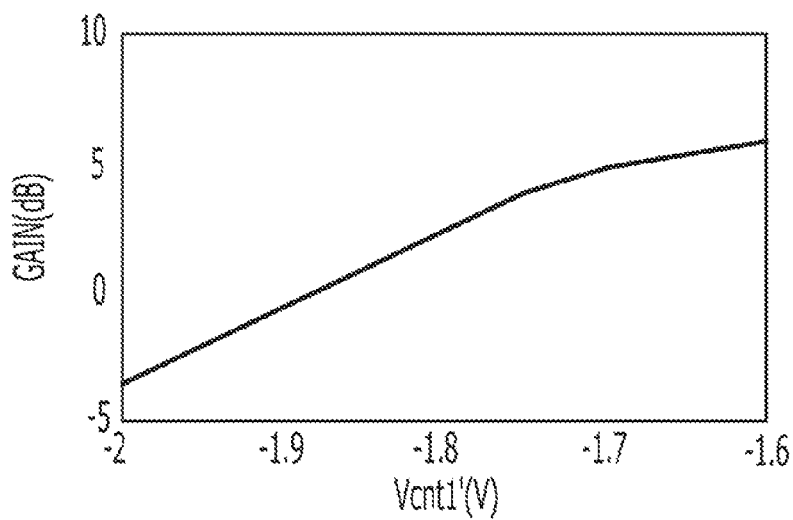

FIG. 16B is a diagram illustrating the gain control characteristic of the first variable delay buffer 35 illustrated in FIG. 15. A gain changes in response to the Vcnt1' as illustrated in FIG. 16B.

Figure 17:
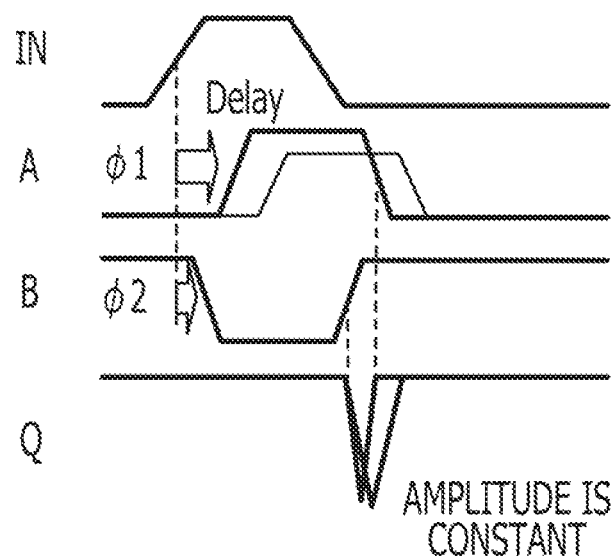
FIG. 17 is a time chart illustrating an operation performed in the short pulse generation section.

FIG. 17 is a time chart illustrating an operation performed in the short pulse generation section 11 in FIG. 14. As illustrated in FIG. 17, when an input signal IN is input to the first variable delay buffer 35, the first variable delay buffer 35 delays the input signal IN by a delay time (Delay) Φ1 specified by the Vcnt1, and outputs a first delayed output A, the gain of which is additionally adjusted to a gain specified by the Vcnt1'. When the input signal IN is also input to the second variable delay buffer 36, the second variable delay buffer 36 inverts the input signal IN, delays the input signal IN by a delay time (Delay) Φ2 specified by the Vcnt2 (the Vcnt2 and the /Vcnt2 are included), and outputs a second delayed output B, the gain of which is additionally adjusted to a gain specified by the Vcnt2'. Since the Φ2 is less than the Φ1, the high (H) portions of the A and B overlap each other in the vicinity of the negative-going edge of the A, and hence the NAND circuit 34 generates a negative impulse Q. Here, when the Vcnt1 and Vcnt2 are changed, the pulse width of the impulse Q is changed. In addition, when the Vcnt1' and Vcnt2' are changed, the gain of the impulse Q is changed.

Therefore, in the fifth embodiment, by changing the Vcnt1' and Vcnt2', the Vcnt1' and Vcnt2' are controlled so that the gain of the NAND circuit 37 becomes small, thereby keeping the pulse amplitude constant. Specifically, in a normal state, when the Vcnt1 is equal to −0.1 V, the Vcnt2 is equal to −0.15 V, the Vcnt1' is equal to −1.6 V, and the Vcnt2' is equal to −1.6 V, the impulse Q, the pulse half-value width of which is 3.5 ps and the pulse amplitude of which is 0.6 V, is output. In a state in which electric power is reduced, when the Vcnt1 is equal to +0.06 V, the Vcnt2 is equal to −0.15 V, the Vcnt1' is equal to −1.88 V, and the Vcnt2' is equal to −1.88 V, the impulse Q, the pulse half-value width of which is 6 ps and the pulse amplitude of which is 0.6 V, is output. In this case, compared with the normal state, the gains of the first variable delay buffer 35 and the second variable delay buffer 36 decrease by 6 dB. Accordingly, even if the pulse half-value width increases, the amplitude is kept constant.

In this way, in the short pulse generation section in the fifth embodiment, a buffer, the delay time and the gain of which are variable, is used. In addition, when the output level of a transmission signal is high, the amplitudes of signals input to a logical AND (NAND) gate are increased, and an overlap time between two signals input to the logical AND circuit is decreased. Furthermore, when the output level of a transmission signal is low, the amplitudes of signals input to a logical AND (NAND) gate are decreased, and an overlap time between two signals input to the logical AND circuit is increased.

As described above, according to the first and the second embodiments, a dynamic range between transmission and reception devices is magnified without the broadband properties and the low noise properties of a transmission amplifier and a reception amplifier being damaged, hence transmission quality is improved. In addition, the configurations of the first and the second embodiments are not limited to a fixed-line communication. In addition, technically, the configurations of the first and the second embodiments are also obviously applicable to mobile communication.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments in accordance with aspects of the present inventions have been described in detail, it should be understood that various changes, substitutions, and alterations could be made hereto without departing from the spirit and scope of the invention.

What is claimed is:

1. An impulse radio communication device comprising:
   a short pulse generator configured to change a shape of an impulse to be output; a bandpass filter configured to receive the impulse and output the impulse as a wave packet;
   an amplifier configured to amplify an output from the bandpass filter; and
   an antenna configured to output the wave packet, output from the amplifier, as a wireless signal, the short pulse generator includes a control section configured to change the shape of the impulse to be output, in response to an environmental condition of a transmission path for wireless communication,
   wherein the control section is configured to generate the impulse, the shape of which causes a spectral intensity of the wireless signal of the wave packet to be high, when a transmission path loss is large; and the control section is configured to generate the impulse, the shape of which causes the spectral intensity of the wireless signal of the wave packet to be low, when the transmission path loss is small.

2. The impulse radio communication device according to claim 1, wherein the control section is configured to change the shape of the impulse to be output so that a pulse width of the impulse is changed with a constant amplitude of the impulse being maintained.

3. The impulse radio communication device according to claim 1, further comprising:
   a monitor configured to detect a weather condition,
   wherein the control section is configured to change the shape of the impulse to be output, in response to the weather condition detected by the monitor.

4. The impulse radio communication device according to claim 1, further comprising:
   a reception section configured to receive reception state information transmitted from a secondary communication device,
   wherein the control section is configured to change the shape of the impulse to be output, in response to the reception state information received by the reception section.

5. The impulse radio communication device according to claim 1, wherein the short pulse generator includes a first variable delay buffer configured to delay a transmission data by a first delay time, and cause the first delay time to change in response to a first delay control signal; a second variable delay buffer configured to delay the transmission data by a second delay time different from the first delay time, and cause the second delay time to change in response to a second delay control signal; and a logical AND circuit configured to generate the impulse by calculating a logical product of an output of the first variable delay buffer and an output of the second variable delay buffer, and cause a gain of the impulse to change in response to a gain control signal, wherein the short pulse generator configured to change a pulse width of the impulse in response to the first delay control signal and the second delay control signal with a constant amplitude of the impulse being maintained using the gain control signal.

6. The impulse radio communication device according to claim 1, wherein the short pulse generator includes a first variable delay buffer configured to output a first delayed output by delaying a transmission data by a first delay time, and cause the first delay time and a gain of the first delayed output to change in response to a first control signal; a second variable delay buffer configured to output a second delayed output by delaying the transmission data by a second delay time, and cause the second delay time and a gain of the second delayed output to change in response to a second control signal; and a logical AND circuit configured to generate the impulse by calculating a logical product of an output of the first variable delay buffer and an output of the second variable delay buffer, wherein the short pulse generator configured to change a pulse width of the impulse in response to the first control signal and the second control signal with a constant amplitude of the impulse being maintained using the first control signal and the second control signal.

7. An impulse radio communication device comprising:
   a short pulse generator;
   a bandpass filter configured to receive an impulse and output the impulse as a wave packet; an amplifier configured to amplify an output from the bandpass filter; and
   an antenna configured to output the wave packet, output from the amplifier, as a wireless signal,
   wherein the short pulse generator includes
   a first variable delay buffer configured to delay a transmission data by a first delay time, and cause the first delay time to change in response to a first delay control signal;
   a second variable delay buffer configured to delay the transmission data by a second delay time different from the first delay time, and cause the second delay time to change in response to a second delay control signal; and
   a logical AND circuit configured to generate the impulse by calculating a logical product of an output of the first variable delay buffer and an output of the second variable delay buffer, and cause a gain of the impulse to change in response to a gain control signal, wherein the short pulse generator configured to change a pulse width of the impulse in response to the first delay control signal and the second delay control signal with a constant amplitude of the impulse being maintained using the gain control signal.

8. An impulse radio communication device comprising:
   a short pulse generator;
   a bandpass filter configured to receive an impulse and output the impulse as a wave packet; an amplifier configured to amplify an output from the bandpass filter; and
   an antenna configured to output the wave packet, output from the amplifier, as a wireless signal, wherein the short pulse generator includes a first variable delay buffer configured to output a first delayed output by delaying a transmission data by a first delay time, and cause the first delay time and a gain of the first delayed output to change in response to a first control signal; a second variable delay buffer configured to output a second delayed output by delaying the transmission data by a second delay time, and cause the second delay time and a gain of the second delayed output to change in response to a second control signal; and a logical AND circuit configured to generate the impulse by calculating a logical product of an output of the first variable delay buffer and an output of the second variable delay buffer, wherein the short pulse generator configured to change a pulse width of the impulse in response to the first control signal and the second control signal with a constant amplitude of the impulse being maintained using the first control signal and the second control signal.

* * * * *